(12) United States Patent
Sambhwani et al.

(10) Patent No.: US 9,338,671 B2
(45) Date of Patent: May 10, 2016

(54) METHOD AND APPARATUS FOR HANDLING PRIMARY SCRAMBLING CODES

(71) Applicant: QUALCOMM Incorporated, San Diego, CA (US)

(72) Inventors: Sharad Deepak Sambhwani, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/218,727

(22) Filed: Mar. 18, 2014

(65) Prior Publication Data

US 2015/0045077 A1 Feb. 12, 2015

Related U.S. Application Data

(60) Provisional application No. 61/864,365, filed on Aug. 9, 2013.

(51) Int. Cl.
| | |
|---|---|
| *H04W 36/00* | (2009.01) |
| *H04W 24/02* | (2009.01) |
| *H04W 56/00* | (2009.01) |
| *H04W 24/10* | (2009.01) |

(52) U.S. Cl.
CPC .............. *H04W 24/02* (2013.01); *H04W 56/00* (2013.01); *H04W 24/10* (2013.01); *H04W 36/0088* (2013.01)

(58) Field of Classification Search
USPC ................ 455/444–452.1, 464; 370/310–320
See application file for complete search history.

(56) References Cited

U.S. PATENT DOCUMENTS

| | | | |
|---|---|---|---|
| 8,488,586 B2 | 7/2013 | Centonza et al. | |
| 9,204,349 B2 * | 12/2015 | Nagaraja ........... | H04W 36/0055 |
| 2010/0178912 A1 | 7/2010 | Gunnarsson et al. | |
| 2010/0203891 A1 * | 8/2010 | Nagaraja ............... | H04W 36/08 |
| | | | 455/436 |
| 2010/0234028 A1 * | 9/2010 | Narasimha ........ | H04W 36/0055 |
| | | | 455/437 |
| 2013/0143555 A1 * | 6/2013 | Singh ................. | H04W 36/0077 |
| | | | 455/434 |
| 2013/0244648 A1 | 9/2013 | Singh et al. | |
| 2014/0242992 A1 * | 8/2014 | Kennedy ........... | H04W 36/0083 |
| | | | 455/436 |
| 2014/0274062 A1 * | 9/2014 | Centonza .............. | H04W 24/10 |
| | | | 455/437 |

FOREIGN PATENT DOCUMENTS

| | | |
|---|---|---|
| EP | 2 197 228 A1 | 6/2010 |
| EP | 2 661 114 A1 | 11/2013 |
| WO | WO-03/041436 A1 | 5/2003 |
| WO | WO-2013107338 A1 | 7/2013 |

OTHER PUBLICATIONS

International Search Report and Written Opinion—PCT/US2014/049632—ISA/EPO—Dec. 18, 2014. (11 total pages).

* cited by examiner

*Primary Examiner* — Fayyaz Alam
(74) *Attorney, Agent, or Firm* — Arent Fox LLP

(57) ABSTRACT

The present disclosure presents a method and apparatus for handling primary scrambling codes (PSC) in a wireless network. For example, the disclosure presents a method for detecting, by a user equipment (UE) of a plurality of UEs, a PSC in search windows with different timing offsets, wherein the different timing offsets correspond to a plurality of small cells sharing the PSC in a coverage area of a macro cell, and transmitting, by the UE, a plurality of measurement reports corresponding to the different timing offsets. As such, primary scrambling codes (PSC) are handled in a wireless network.

20 Claims, 7 Drawing Sheets

METHOD AND APPARATUS FOR HANDLING PRIMARY SCRAMBLING CODES

CLAIM OF PRIORITY UNDER 35 U.S.C. §119

The present application for patent claims priority to U.S. Provisional Patent Application No. 61/864,365, filed Aug. 9, 2013, entitled "Handling PSC Confusion in Massive Small Cell Deployments," which is assigned to the assignee hereof, and hereby expressly incorporated by reference herein.

BACKGROUND

The present disclosure relates generally to communication systems, and more particularly, to an apparatus and method of power and resource management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, in dense small cell deployments, balancing network capacity and user equipment (UE) mobility considerations are important in improving the overall system performance and user experience. On one hand, having many small cells provides spatial reuse and improves the system capacity. On the other hand, having many small cells covering a given region can pose challenges as the UE may not be able to distinguish amongst multiple neighboring small cells that transmit on the same primary scrambling code (PSC).

Thus, there is a desire for an improved method and apparatus for handling primary scrambling codes in a wireless network.

SUMMARY

Various aspects are now described with reference to the drawings. In the following description, for purposes of explanation, numerous specific details are set forth in order to provide a thorough understanding of one or more aspects. It may be evident, however, that such aspect(s) may be practiced without these specific details. The following presents a simplified summary of one or more aspects in order to provide a basis understanding of such aspects.

The present disclosure presents an example method and apparatus for handling primary scrambling codes in a wireless network. For example, the present disclosure presents an example method for handling primary scrambling codes in a wireless network that includes detecting, by a user equipment (UE) of a plurality of UEs, a PSC in search windows with different timing offsets, wherein the different timing offsets correspond to a plurality of small cells sharing the PSC in a coverage area of a macro cell, and transmitting, by the UE, a plurality of measurement reports corresponding to the different timing offsets.

In an additional aspect, the present disclosure presents an example apparatus for handling primary scrambling code in a wireless network which may include means for detecting, by a user equipment (UE) of a plurality of UEs, a PSC in search windows with different timing offsets, wherein the different timing offsets correspond to a plurality of small cells sharing the PSC in a coverage area of a macro cell, and means for transmitting, by the UE, a plurality of measurement reports corresponding to the different timing offsets.

Moreover, the present disclosure presents an example computer program product for handling primary scrambling code in a wireless network which may include a computer-readable medium comprising code for detecting, by a user equipment (UE) of a plurality of UEs, a PSC in search windows with different timing offsets, wherein the different timing offsets correspond to a plurality of small cells sharing the PSC in a coverage area of a macro cell, and transmitting, by the UE, a plurality of measurement reports corresponding to the different timing offsets.

In a further aspect, the present disclosure presents an example apparatus for handling primary scrambling codes in a wireless network which may include a primary scrambling code (PSC) detecting component to detect, by a user equipment (UE) of a plurality of UEs, a PSC in search windows with different timing offsets, wherein the different timing offsets correspond to a plurality of small cells sharing the PSC in a coverage area of a macro cell, and a measurement report transmitting component to transmit, by the UE, a plurality of measurement reports corresponding to the different timing offsets.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides apparatus and methods for handling primary scrambling codes in a wireless network by detecting a PSC in search windows with different timing offsets, wherein the different timing offsets correspond to a plurality of small cells sharing the PSC in a coverage area of a macro cell, and transmitting a plurality of measurement reports corresponding to the different timing offsets.

Figure 1:
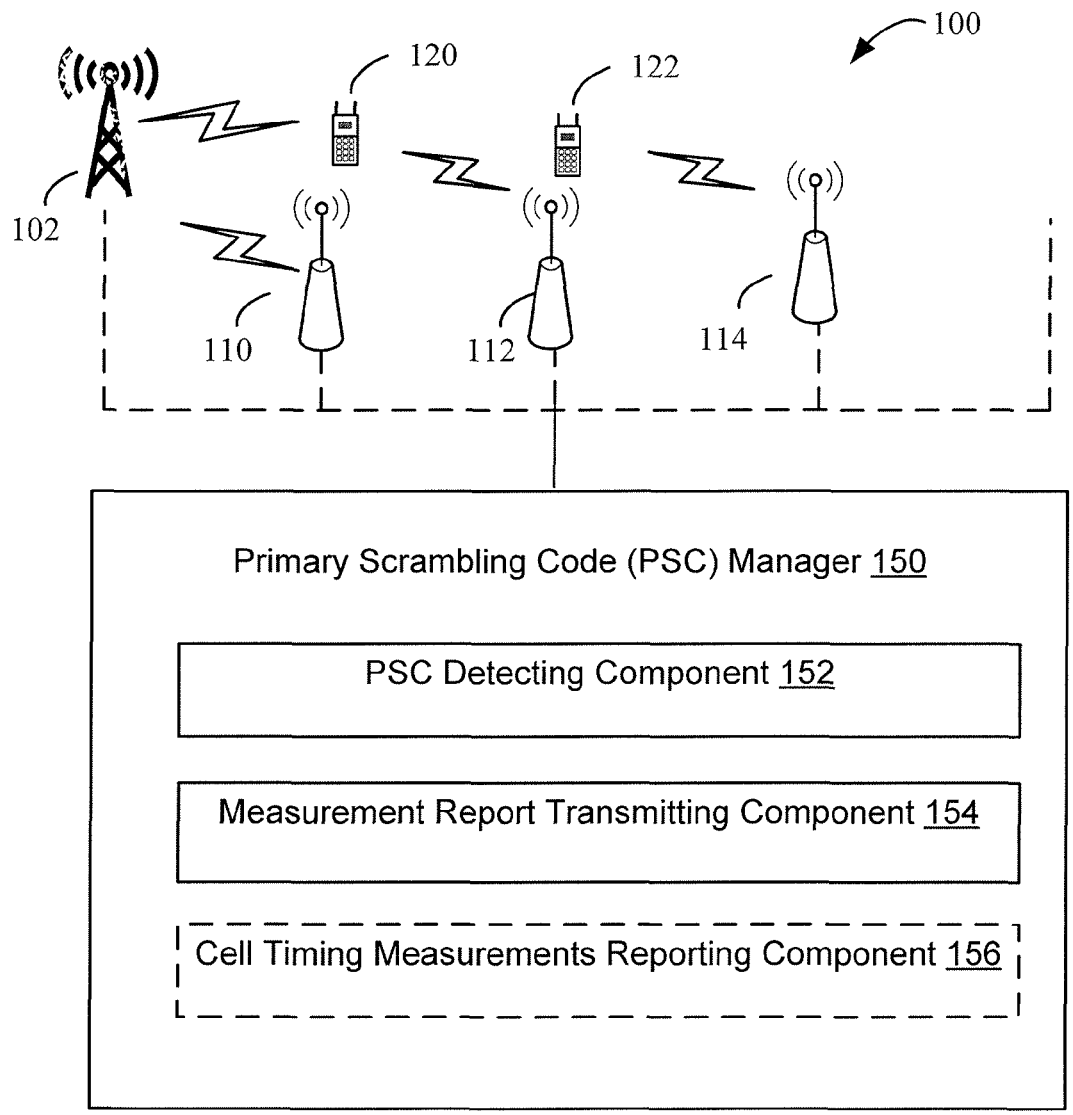
FIG. 1 is schematic diagram of a network architecture including an aspect of a primary scrambling code manager.

Referring to FIG. 1, a wireless communication system 100 is illustrated for handling primary scrambling codes (PSC) that distinguishes multiple neighbor cells which transmit on the same scrambling code (e.g., primary scrambling code) in heterogeneous networks. In an aspect, system 100 may include a primary scrambling code (PSC) manager 150 that may be configured to include a PSC detecting component 152, a measurement report transmitting component 154 and/or a cell timing measurements reporting component 156.

For example, in an aspect, UEs 120 and 122 may be located in a dense network of a plurality of base stations, for example, smell cells 110, 112 and/or 114, and one or more macro base stations (or macro cell) 102. The small cells 110, 112, and/or 114 are located in the coverage area of the macro base station.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

In dense small cell deployments, a UE, e.g., UE 120 may not be able to store or maintain two entries in a neighbor list with the same primary scrambling code with different timing offsets associated with different small cells, for example, small cells 110 and 112 when both the small cells 110 and 112 are transmitting the same scrambling code with different timing offsets. In an aspect, network 100 may maintain an estimate of relative time differences between a macro cell and small cells in the coverage area of the macro cell. For example, estimates of relative time differences between macro cell 102 and small cells 110, 112, and/or 114 may be maintained at the network. In an example aspect, a macro radio network controller (Macro RNC), not shown, of network 100 may maintain the estimates of the relative time differences between the macro cell and the small cells.

For example, the reference time difference to cell, that may be in a system information message, indicates the timing difference between the primary Common Control Physical Channel (CCPCH) of the current cell (e.g., serving cell) and the primary CCPCH of a neighboring cell. In a measurement control message, the reference time difference to cell indicates the timing difference between UE uplink transmission timing and the primary CCPCH of a neighboring cell.

In an aspect, the reference time difference to cell IE (as shown below in Table 1) may be further enhanced to provide more granularity for dense small cell deployments.

TABLE 1

| Reference time difference to cell | | | | |
|---|---|---|---|---|
| Information Element/Group name | Need | Multi | Type and reference | Semantics description |
| CHOICE accuracy | MP | | | |
| >40 chips | | | | |
| >>Reference time difference | MP | | Integer (0 ... 38400 by step of 40) | In chips |
| >256 chips | | | | |
| >>Reference time difference | MP | | Integer (0 ... 38400 by step of 256) | In chips |
| >2560 chips | | | | |
| >>Reference time difference | MP | | Integer (0 ... 38400 by step of 2560) | In chips |

In an aspect, the estimates may be derived from the cell timing information in measurement reports transmitted by UEs in network 100. For example, the network may derive the estimates from the measurements reports transmitted by UEs 120 and/or 122 which may be contain timing information of cells 110, 12, and/or 114.

In an aspect, network 100 may configure multiple measurements in a UE when the same primary scrambling code or scrambling code appears in multiple measurements configurations. For example, network 100 may configure UE 120 with multiple measurements when the same primary scrambling code appears in multiple search windows when the UE is searching for a cell. In additional aspect, in each measurement configuration, for each of the neighbor cells that appear in the CELL_INFO list, the network aids the UE further by indicating the relative time differences between the cell the UE is camped on (or serving cell) and the neighbor cell.

In an aspect, when a UE performs new cell identification and/or pilot measurements, the UE searches for the same PSC on different relative timing offsets to the macro cell corresponding to the signaled relative time differences described above. If the UE detects the same PSC in search windows around two different timing offsets (as signaled by the network in separate measurement configurations), the UE sends separate measurement reports corresponding to the separate measurement configurations For example, when UE 120 sends separate measurement reports that correspond to different timing offsets that correspond to different small cells, the network may be able to distinguish better between the small cells and avoids ambiguity at the network with regard to the PSC that the UE detected.

In an example aspect, two small cells, e.g., small cells 110 and 112 under the same macro cell, e.g., macro cell 102, may re-use the same primary scrambling code. For example, small cells 110 and 112 may use "PSC_1" as the primary scrambling code. Based on cell timing measurements reported by multiple UEs, e.g., UEs 120 and/or 122, the macro RNC has an estimate of timing differences between the macro cell and each of the small cells. That is, based on the cell timing measurements transmitted by UE 120 and/or 122, the macro RNC has an estimate of timing differences between macro cell 102 and small cell 120 and/or macro cell 102 and small cell 122.

Additionally, the Macro RNC may configure a UE, e.g., UE 120 with two measurement control messages with two measurement identifiers, e.g., MCM_1 and MCM_2 that further includes two different CELL_INFO lists, PSC_1 with a first reference time difference to cell (e.g., timing A) and PSC_1 with a second reference time difference (e.g., timing B), which is different from Timing A.

If UE 120 detects PSC_1 on each of the two reference time differences as described above, UE 120 reports pilot measurement information for PSC_1 in each of the measurement reports (e.g., MR_1 and MR_2 corresponding to MCM_1 and MCM_2). In an additional aspect, the signaling of the information reference time difference to cell IE may be enhanced to provide more granularity for small cell deployment.

In an aspect, primary scrambling code (PSC) manager 150 may be configured to include a PSC detecting component 152, a measurement report transmitting 154 and/or a cell timing measurements reporting component 156 as described above. In an aspect, PSC detecting component 152 may be configured to detect a primary scrambling code in search windows during a cell search performed by a UE. For example, in an aspect, PSC detecting component 152 may detect two or more cells with the same primary scrambling code during the cell search by the UE. However, the detected cells may have different relative time differences as described above.

In an aspect, measurement report transmitting component 154 may be configured to transmit a plurality of measurement reports corresponding to the different timing offsets. For example, in an aspect, measurement report transmitting component 154 may be configured to transmit a plurality of measurement reports corresponding to the difference timing offsets that are associated with the different small cells.

In an additional or optional aspect, PSC Manager 150 may be configured to store or maintain two or more entries with the same PSC associated with two or more small cells with different timing offsets as described above. In an aspect, for example, this may allow the UE transmit measurement reports for each of the entries with different timing offsets but associated with the same PSC.

Therefore, according to the present apparatus and methods, primary scrambling code manager 150 handles primary scrambling codes (PSC) in a wireless network with dense small cell deployments.

Figure 2:
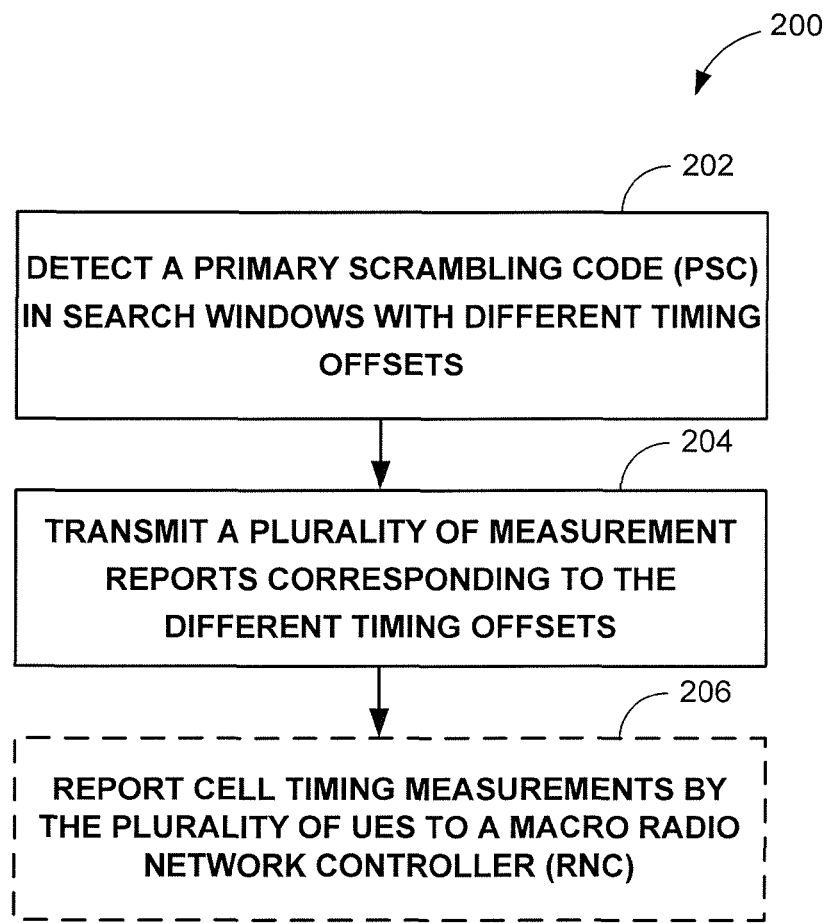
FIG. 2 is an example flow chart for handling primary scrambling codes in wireless network.

FIG. 2 illustrates an example methodology 200 for handling primary scrambling codes in a wireless network. In an aspect, at block 202, methodology 200 may include detecting, by a user equipment (UE) of a plurality of UEs, a PSC in search windows with different timing offsets, wherein the different timing offsets correspond to a plurality of small cells sharing the PSC in a coverage area of a macro cell. For example, UE 120, primary scrambling code (PSC) manager 150 and/or PSC detecting component 152 may detect two or more cells with a primary scrambling code "PSC_1" with different timing offsets when searching for a cell.

Further, at block 204, methodology 200 may include transmitting, by the UE, a plurality of measurement reports corresponding to the different timing offsets. For example, in an aspect, UE 120, primary scrambling code (PSC) manager 150 and/or measurement report transmitting component 154 may transmit a plurality of measurement reports corresponding to the different timing offsets.

Furthermore, in an optional aspect, at block 206, methodology 200 may include reporting cell timing measurements by the plurality of UEs to a macro radio network controller (RNC). For example, in an aspect, UE 120, primary scrambling code (PSC) manager 150 and/or cell timing measurements reporting component 156 may report cell timing measurements to a macro RNC.

Figure 3:
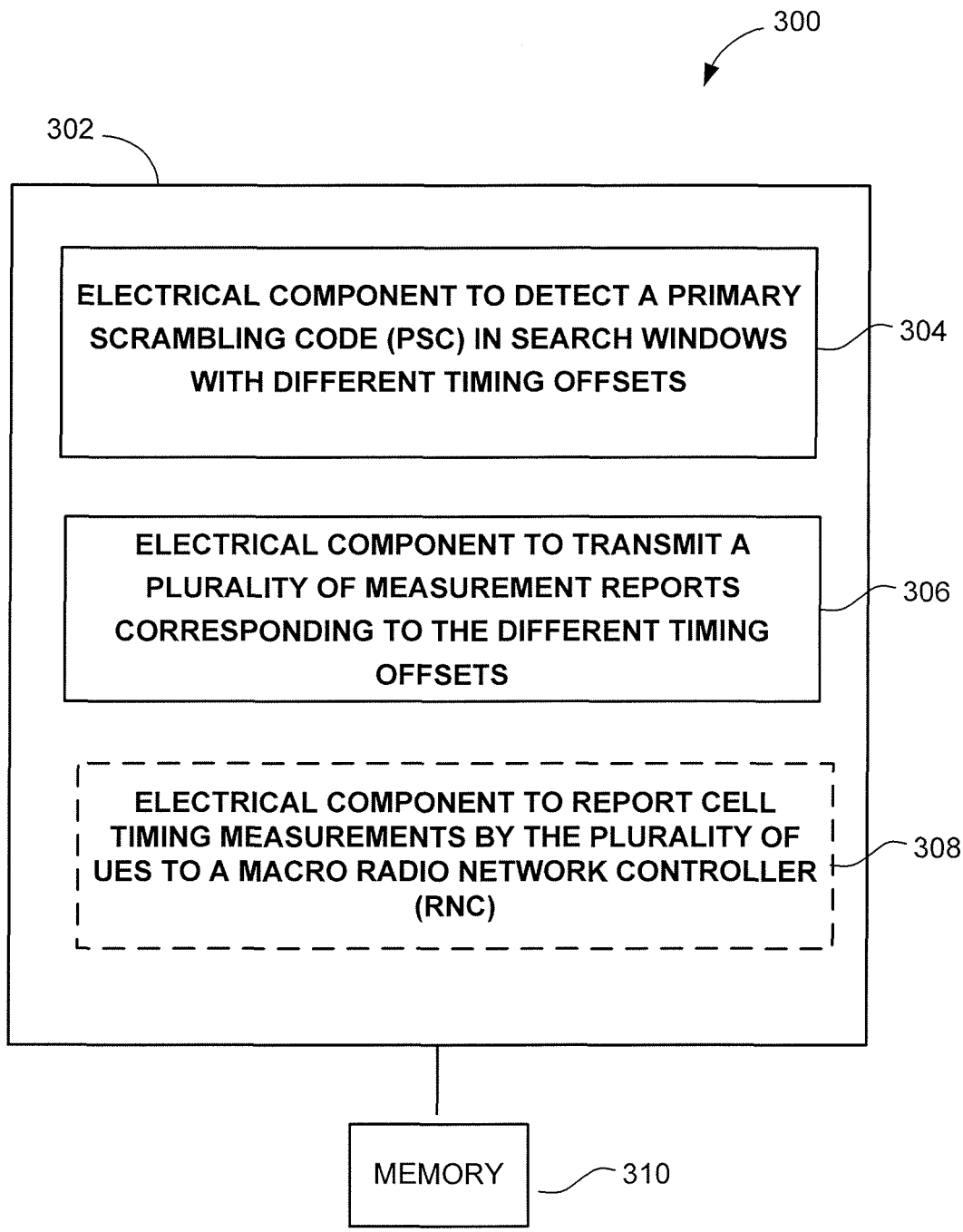
FIG. 3 is a block diagram illustrating aspects of a logical grouping of electrical components as contemplated by the present disclosure.

Referring to FIG. 3, an example system 300 is displayed for handling primary scrambling codes in a wireless network. For example, system 300 can reside at least partially within a user equipment, e.g., UE 120 (FIG. 1). It is to be appreciated that system 300 is represented as including functional blocks, which can be functional blocks that represent functions implemented by a processor, software, or combination thereof (for example, firmware). System 300 includes a logical grouping 302 of electrical components that can act in conjunction. For instance, logical grouping 302 may include an electrical component 304 for detecting, by a user equipment (UE) of a plurality of UEs, a PSC in search windows with different timing offsets, wherein the different timing offsets correspond to a plurality of small cells in a coverage area of a macro cell. In an aspect, electrical component 304 may comprise primary scrambling code manage 150 and/or primary scrambling code detecting component 152 (FIG. 1).

Additionally, logical grouping 302 may include an electrical component 306 for transmitting, by the UE, a plurality of measurement reports corresponding to the different timing offsets. In an aspect, electrical component 306 may comprise primary scrambling code manage 150 and/or measurements report transmitting component 154 (FIG. 1).

In an additional or optional aspect, logical grouping 302 may optionally include an electrical component 308 for reporting cell timing measurements by the plurality of UEs to a macro radio network controller (RNC), wherein the macro RNC estimates timing differences between the macro cell and each of the plurality of small cells. In an aspect, electrical component 308 may comprise primary scrambling code manage 150 and/or cell timing measurements reporting component 156 (FIG. 1).

Additionally, system 300 can include a memory 310 that retains instructions for executing functions associated with the electrical components 304, 306, and 308, stores data used or obtained by the electrical components 304, 306, and 308 etc. While shown as being external to memory 310 it is to be understood that one or more of the electrical components 304, 306, and 308 can exist within memory 310. In one example, electrical components 304, 306, and 308 can comprise at least one processor, or each electrical component 304, 306, and 308 can be a corresponding module of at least one processor. Moreover, in an additional or alternative example, electrical components 304, 306, and 308 can be a computer program product including a computer readable medium, where each electrical component 304, 306, and 308 can be corresponding code.

Figure 4:
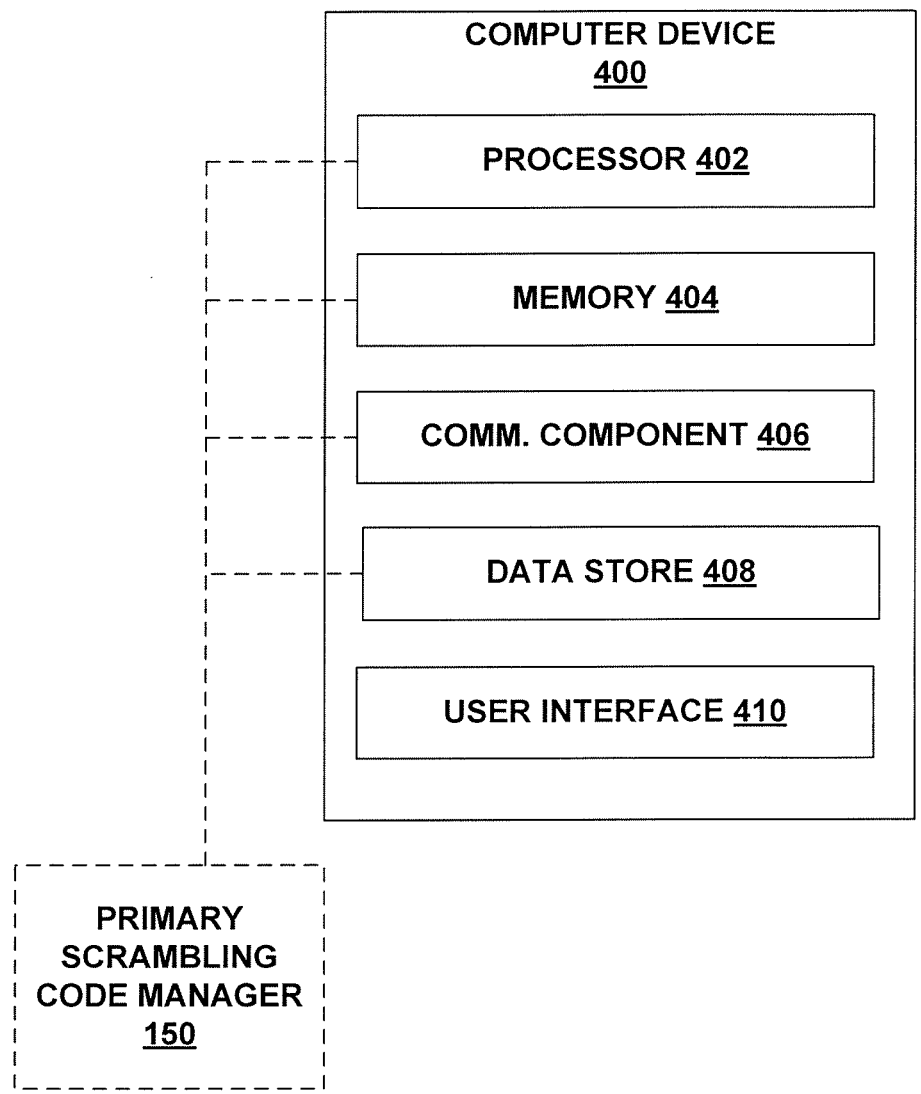
FIG. 4 is a block diagram illustrating aspects of a computer device according to the present disclosure.

Referring to FIG. 4, in one aspect, any of UEs 120 and 122, including joint primary scrambling code manager 150 (FIG. 1) may be represented by a specially programmed or configured computer device 400. In one aspect of implementation, computer device 400 may include primary scrambling code manager 150, primary scrambling code detecting component 152, measurement report transmitting component 154, and/or cell timing measurements reporting component 156 (FIG. 1), such as in specially programmed computer readable instructions or code, firmware, hardware, or some combination thereof. Computer device 400 includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system.

Computer device 400 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof.

Further, computer device 400 includes a communications component 406 that provides for establishing and maintaining communications with one or more parties utilizing hardware, software, and services as described herein. Communications component 406 may carry communications between components on computer device 400, as well as between computer device 400 and external devices, such as devices located across a communications network and/or devices serially or locally connected to computer device 400. For example, communications component 406 may include one or more buses, and may further include transmit chain components and receive chain components associated with a transmitter and receiver, respectively, or a transceiver, operable for interfacing with external devices. In an additional aspect, communications component 406 may be configured to receive one or more pages from one or more subscriber networks. In a further aspect, such a page may correspond to the second subscription and may be received via the first technology type communication services.

Additionally, computer device 400 may further include a data store 408, which can be any suitable combination of hardware and/or software, that provides for mass storage of information, databases, and programs employed in connection with aspects described herein. For example, data store 408 may be a data repository for applications not currently being executed by processor 402 and/or any threshold values or finger position values.

Computer device 400 may additionally include a user interface component 410 operable to receive inputs from a user of computer device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Figure 5:
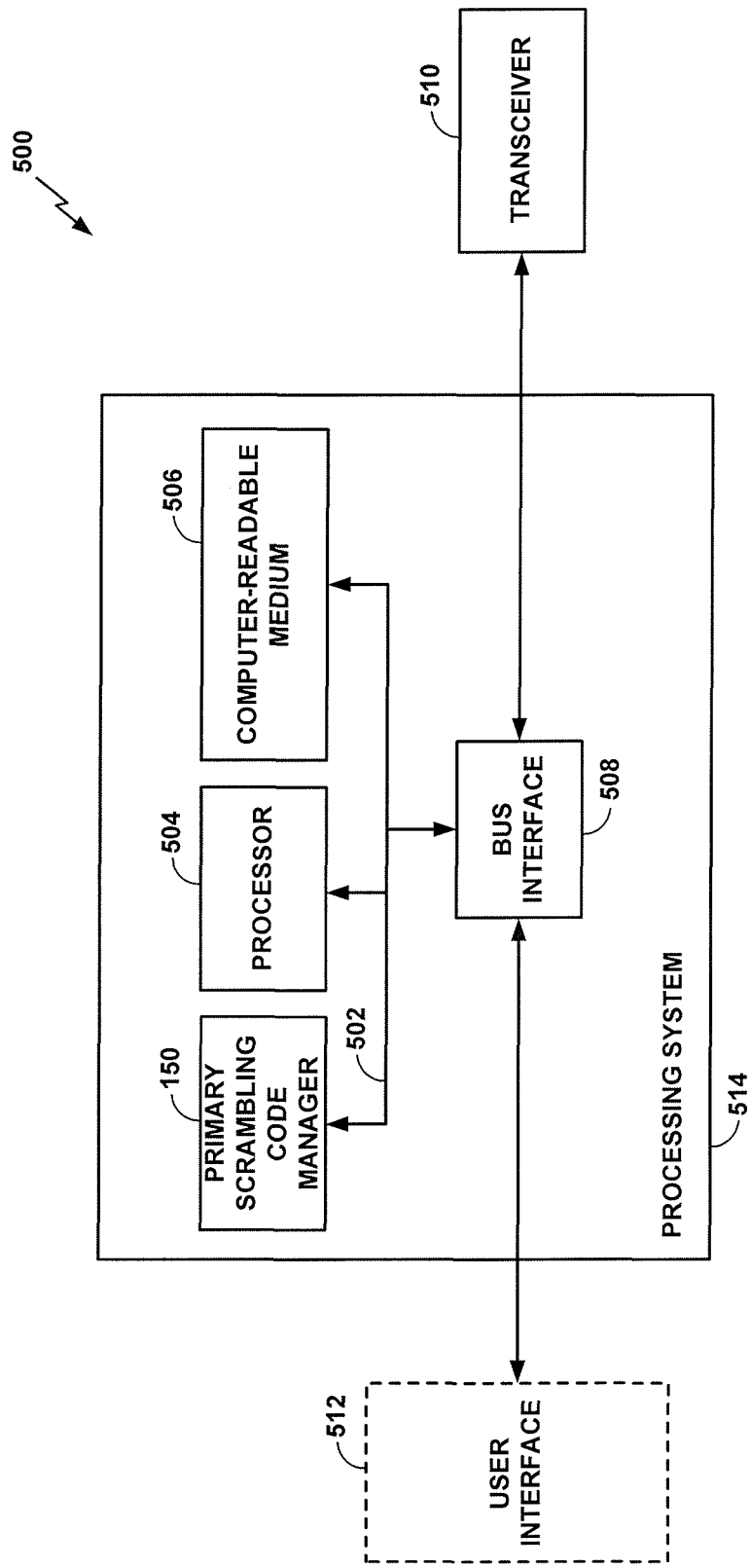
FIG. 5 is a block diagram illustrating an example of a hardware implementation for an apparatus employing a processing system.

FIG. 5 is a block diagram illustrating an example of a hardware implementation for an apparatus 500, for example, including primary scrambling code manager 150, primary scrambling code detecting component 152, measurement report transmitting component 154, and/or cell timing measurements reporting component 156 of FIG. 1, employing a processing system 514 for carrying out aspects of the present disclosure, such as method for joint power and resource management. In this example, the processing system 514 may be implemented with bus architecture, represented generally by a bus 502. The bus 502 may include any number of interconnecting buses and bridges depending on the specific application of the processing system 514 and the overall design constraints. The bus 502 links together various circuits including one or more processors, represented generally by the processor 504, computer-readable media, represented generally by the computer-readable medium 505, and one or more components described herein, such as, but not limited to, primary scrambling code manager 150, primary scrambling code detecting component 152, measurement report transmitting component 154, and/or cell timing measurements reporting component 156 (FIG. 1). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 505. The software, when executed by the processor 504, causes the processing system 514 to perform the various functions described infra for any particular apparatus. The computer-readable medium 505 may also be used for storing data that is manipulated by the processor 504 when executing software.

Figure 6:
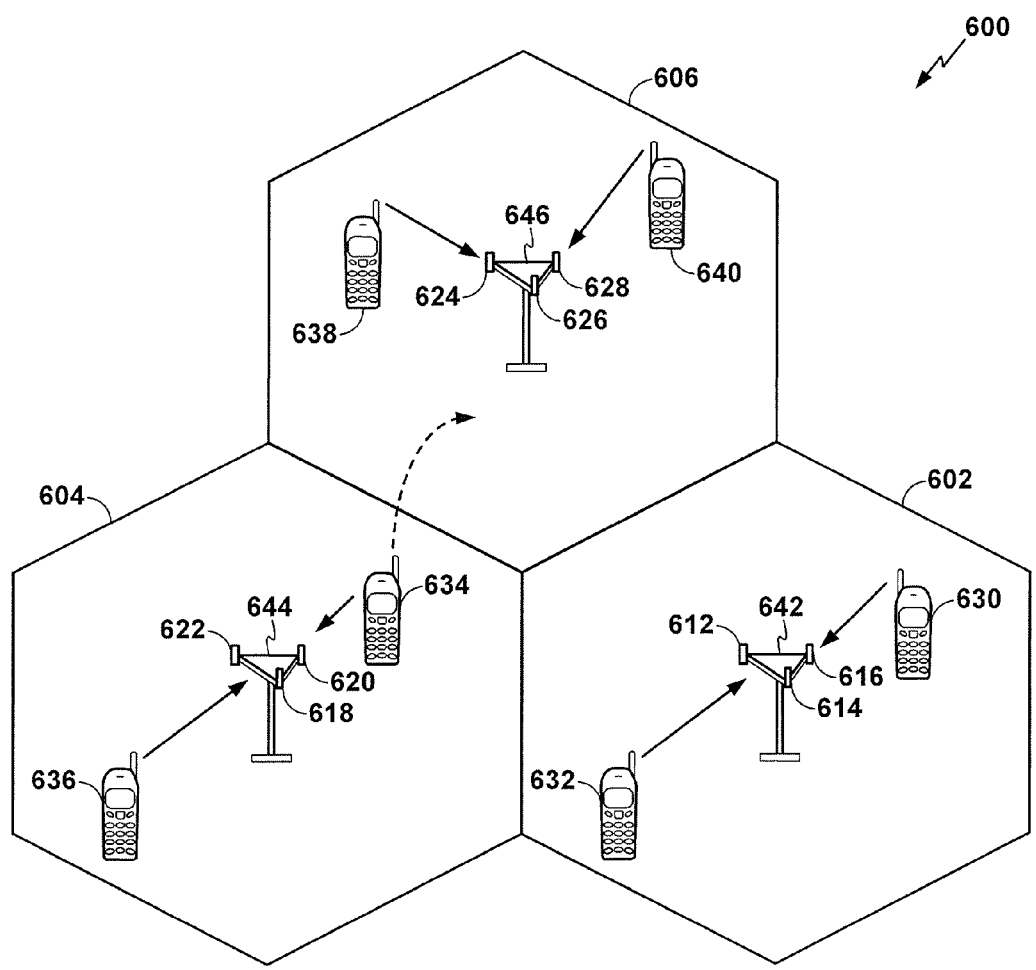
FIG. 6 is a conceptual diagram illustrating an example of an access network.

Referring to FIG. 6, an example access network 600 is illustrated, and may include one or more UEs configured to include a primary scrambling code manager 150 (FIG. 1). The multiple access wireless communication system includes multiple cellular regions (cells), including cells 602, 604, and 606, each of which may include one or more sectors and which may be base station 102, 110, 112, and/or 114 of FIG. 1. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 616, 620, and 622 each correspond to a different sector. In cell 606, antenna groups 624, 626, and 628 each correspond to a different sector. The cells 602, 604 and 606 may include several wireless communication devices, e.g., User Equipment or UEs, for example, including UEs 120 and/or 122 of FIG. 1, which may be in communication with one or more sectors of each cell 602, 604 or 606. For example, UEs 630 and 632 may be in communication with NodeB 642, UEs 634 and 636 may be in communication with NodeB 644, and UEs 636 and 640 can be in communication with NodeB 646. Here, each NodeB 642, 644, 646 is configured to provide an access point for all the UEs 630, 632, 634, 636, 638, 640 in the respective cells 602,

604, and 606. Additionally, each NodeB 642, 644, 646 and UEs 630, 632, 634, 636, 638, 640 may be UE 120 of FIG. 1 and may perform the methods outlined herein.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller, or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set). In any case, UE 634 may execute primary scrambling code manager 150 to perform the reselection operations described herein.

Further, the modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 902.11 (Wi-Fi), IEEE 902.16 (WiMAX), IEEE 902.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
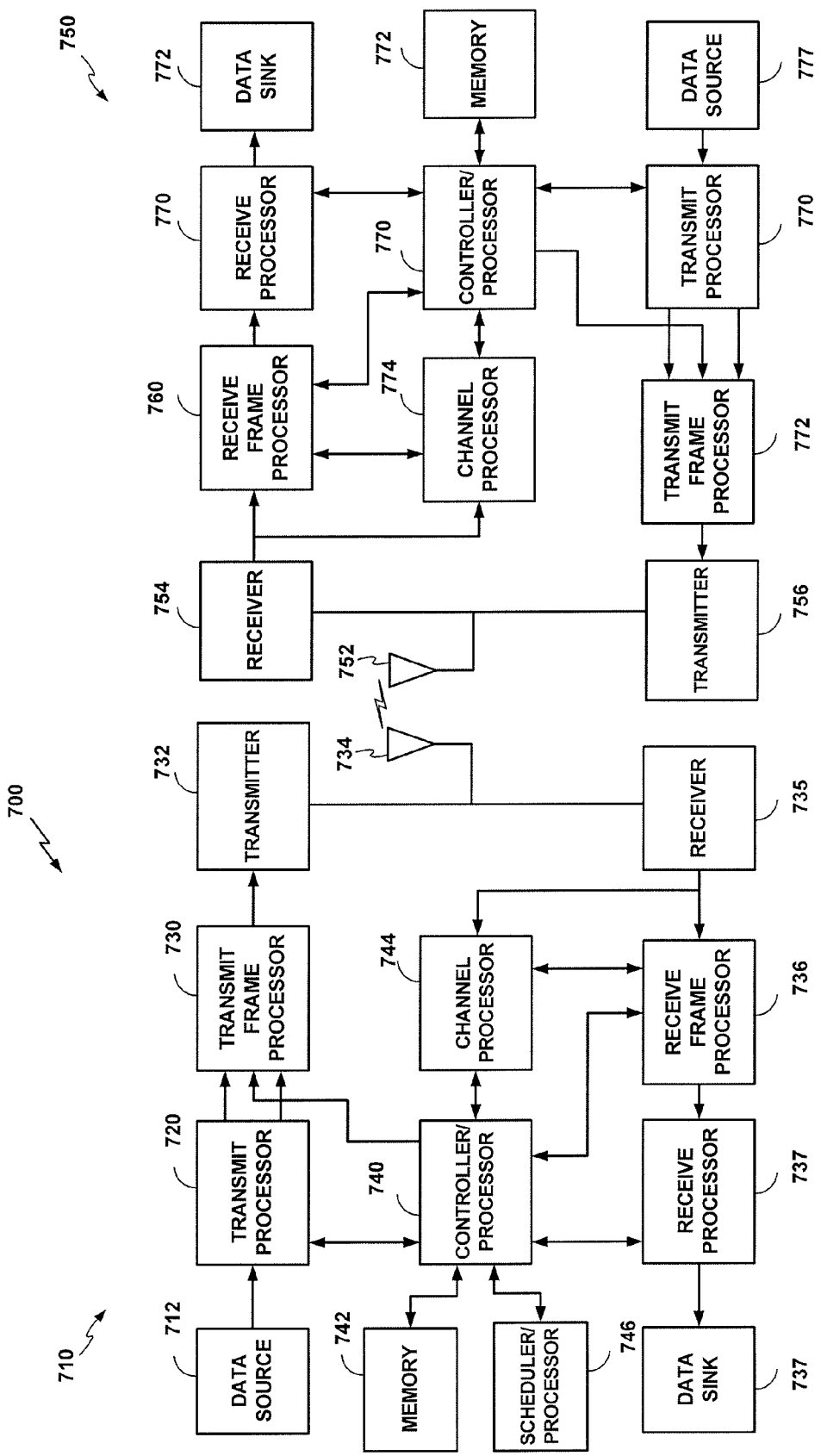
FIG. 7 is a block diagram conceptually illustrating an example of a NodeB in communication with a UE in a telecommunications system.

FIG. 7 is a block diagram of a NodeB 710 in communication with a UE 750, where the NodeB 710 may one or more of base stations 102, 110, 112, and/or 114, and/or may include a primary scrambling code manager 150, primary scrambling code detecting component 152, measurement report transmitting component 154, and/or cell timing measurements reporting component 156 (igG 1). In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the NodeB 77. More specifically, the receive processor 770 descrambles and de-spreads the symbols, and then determines the most likely signal constellation points transmitted by the NodeB 77 based on the modulation scheme. These soft decisions may be based on channel estimates computed by the channel processor 794. The soft decisions are then decoded and de-interleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 777 and control signals from the controller/processor 790 are provided to a transmit processor 770. The data source 777 may represent applications running in the UE 750 and various user interfaces (e.g., keyboard). Similar to the functionality described in connection with the downlink transmission by the NodeB 77, the transmit processor 770 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the NodeB 77 or from feedback contained in the midamble transmitted by the NodeB 77, may be used to select the appropriate coding, modulation, spreading, and/or scrambling schemes. The symbols produced by the transmit processor 770 will be provided to a transmit frame processor 772 to create a frame structure. The transmit frame processor 772 creates this frame structure by multiplexing the symbols with information from the controller/processor 790, resulting in a series of frames.

The frames are then provided to a transmitter 756, which provides various signal conditioning functions including amplification, filtering, and modulating the frames onto a carrier for uplink transmission over the wireless medium through the antenna 752.

The uplink transmission is processed at the NodeB 77 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 737. The receive processor 737 performs the inverse of the processing performed by the transmit processor 770 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the NodeB 710 and the UE 750, respectively. For example, the controller/processors 740 and 790 may provide various functions including timing, peripheral interfaces, voltage regulation, power management, and other control functions. The computer readable media of memories 742 and 792 may store data and software for the NodeB 710 and the UE 750, respectively. A scheduler/processor 746 at the NodeB 710 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for handling primary scrambling codes (PSC) in a wireless network, comprising:
   detecting, by a user equipment (UE) of a plurality of UEs, a PSC in a plurality of search windows with different timing offsets, wherein the different timing offsets correspond to a plurality of small cells sharing the PSC in a coverage area of a macro cell; and
   transmitting, by the UE, a plurality of measurement reports corresponding to the different timing offsets in response to the detecting of the PSC in the plurality of search windows with different timing offsets.

2. The method of claim 1, further comprising:
   reporting cell timing measurements by the plurality of UEs to a macro radio network controller (RNC), wherein the macro RNC estimates timing differences between the macro cell and each of the plurality of small cells based at least on the reported cell timing measurements.

3. The method of claim 2, wherein the UE is configured with a plurality of measurement control messages, and wherein each measurement control message comprises a unique measurement identifier.

4. The method of claim 3, wherein the transmitting of the plurality of measurement reports corresponding to the plurality of timing offsets in response to the UE being configured with the plurality of measurement control messages.

5. The method of claim 1, wherein the PSC is detected in the plurality of search windows with the different timing offsets when performing new cell identification or pilot measurements.

6. An apparatus for handling primary scrambling codes (PSC) in a wireless network, comprising:
   means for detecting, by a user equipment (UE) of a plurality of UEs, a PSC in a plurality of search windows with different timing offsets, wherein the different timing offsets correspond to a plurality of small cells sharing the PSC in a coverage area of a macro cell; and
   means for transmitting, by the UE, a plurality of measurement reports corresponding to the different timing offsets in response to detecting the PSC in the plurality of search windows with different timing offsets.

7. The apparatus of claim 6, further comprising:
   means for reporting cell timing measurements by the plurality of UEs to a macro radio network controller (RNC), wherein the macro RNC estimates timing differences between the macro cell and each of the plurality of small cells based at least on the reported cell timing measurements.

8. The apparatus of claim 7, wherein the UE is configured with a plurality of measurement control messages, and wherein each measurement control message comprises a unique measurement identifier.

9. The apparatus of claim 8, wherein the means for transmitting the plurality of measurement reports corresponding to the plurality of timing offsets comprises means for transmitting in response to the UE being configured with the plurality of measurement control messages.

10. The apparatus of claim 6, wherein the PSC is detected in the plurality of search windows with the different timing offsets when performing new cell identification or pilot measurements.

11. A non-transitory computer readable medium storing computer executable code for handling primary scrambling codes (PSC) in a wireless network, comprising:
    code for detecting, by a user equipment (UE) of a plurality of UEs, a PSC in a plurality of search windows with different timing offsets, wherein the different timing offsets correspond to a plurality of small cells sharing the PSC in a coverage area of a macro cell; and
    code for transmitting, by the UE, a plurality of measurement reports corresponding to the different timing offsets in response to the detecting of the PSC in the plurality of search windows with different timing offsets.

12. The computer readable medium of claim 11, further comprising:
    code for reporting cell timing measurements by the plurality of UEs to a macro radio network controller (RNC), wherein the macro RNC estimates timing differences between the macro cell and each of the plurality of small cells based at least on the reported cell timing measurements.

13. The computer readable medium of claim 12, wherein the UE is configured with a plurality of measurement control messages, and wherein each measurement control message comprises a unique measurement identifier.

14. The computer readable medium of claim 13, wherein the code for transmitting the plurality of measurement reports corresponding to the plurality of timing offsets comprises code for transmitting in response to the UE being configured with the plurality of measurement control messages.

15. The computer readable medium of claim 11, wherein the PSC is detected in the plurality of search windows with the different timing offsets when performing new cell identification or pilot measurements.

16. An apparatus for handling primary scrambling codes (PSC) in a wireless network, comprising:
    a primary scrambling code (PSC) detecting component to detect, by a user equipment (UE) of a plurality of UEs, a PSC in a plurality of search windows with different timing offsets, wherein the different timing offsets correspond to a plurality of small cells sharing the PSC in a coverage area of a macro cell; and
    a measurement report transmitting component to transmit, by the UE, a plurality of measurement reports corresponding to the different timing offsets in response to detecting the PSC in the plurality of search windows with different timing offsets.

17. The apparatus of claim 16, further comprising:
    a cell timing measurements reporting component to report cell timing measurements by the plurality of UEs to a macro radio network controller (RNC), wherein the macro RNC estimates timing differences between the macro cell and each of the plurality of small cells based at least on the reported cell timing measurements.

18. The apparatus of claim 17, wherein the UE is configured with a plurality of measurement control messages, and wherein each measurement control message comprises a measurement identifier.

19. The apparatus of claim 18, wherein the measurement report transmitting component to transmit the plurality of measurement reports corresponding to the plurality of timing offsets comprises the measurement report transmitting component configured to transmit in response to the UE being configured with the plurality of measurement control messages.

20. The apparatus of claim 16, wherein the PSC is detected in the plurality of search windows with the different timing offsets when performing new cell identification or pilot measurements.

* * * * *